United States Patent Office.

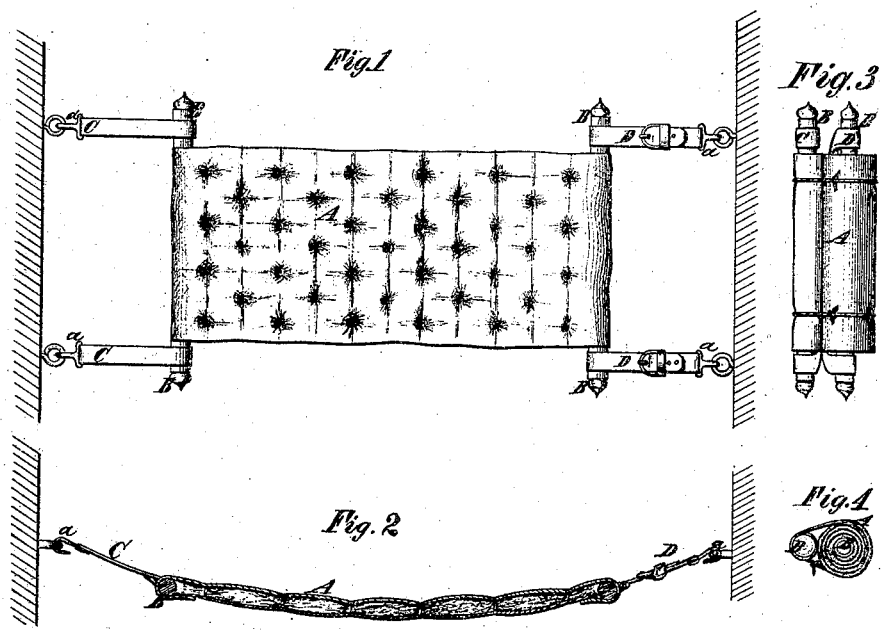

JULIUS KRISCH AND CHARLES THOENER, OF NEW YORK, N. Y.

Letters Patent No. 113,307, dated April 4, 1871.

IMPROVEMENT IN ROLLING BEDS.

The Schedule referred to in these Letters Patent and making part of the same.

*To all whom it may concern:*

Be it known that we, JULIUS KRISCH and CHARLES THOENER, both of the city, county, and State of New York, have invented a new and useful Rolling Bed; and we do hereby declare that the following is a full, clear, and exact description thereof, reference being had to the accompanying drawing forming part of this specification.

This invention consists in a bed having secured transversely across or within its end rollers or rigid stretchers, by which it is prevented from sagging laterally, and which have attached to them, at or near their extremities, straps by which they may be secured to ring-bolts or other contrivances fastened in the walls of the room, or in any other support, for the purpose of extending the bed for use.

Such a bed is capable of being taken down and rolled up and stowed away in a small compass during the daytime when not required for use, and when in use it occupies very little room, and by dispensing with a bedstead gets rid, to a great extent, of vermin, which is so great a nuisance in bed-rooms.

In the drawing—

Figure 1 is a plan of the bed showing it extended;
Figure 2 is a longitudinal section of the same;
Figure 3 is a plan of the bed rolled up; and
Figure 4 is an end view of it also rolled up.

Similar letters of reference indicate corresponding parts in all the figures.

A is the bed, which, as represented in figs. 1 and 2 of the drawing, is padded and tufted like a mattress, but which may consist simply of a strip of canvas or other material, as shown in figs. 3 and 4.

Secured within the ends of the bed are the rollers or rigid stretchers B B of wood, or other material, which, in addition to preserving the shape of the bed by preventing it from sagging transversely, extend beyond it to provide for the attachment thereto of straps, C C and D D, by which it is hung, said straps being provided at their outer ends with hooks, *a a*, by means of which they are attached to ring-bolts or staples in the wall or other support from which the bed is hung.

The straps D D at the head of the bed are made in two pieces, one attached to the hook and provided with a buckle, and the other attached to the roller, so that, after the bed is hung, it may be drawn tight and so secured by the buckle.

When the bed is not required to be used it may be taken down and rolled up on one of the rollers, the straps attached to that roller being tucked inside, and when rolled up it may be so secured by the straps attached to the other roller.

What we claim as our invention, and desire to secure by Letters Patent, is—

The bed A, provided with rollers B B or rigid stretchers at its ends, and straps C C and D D attached to said rollers or stretchers, substantially as and for the purpose herein set forth.

JULIUS KRISCH.
CHARLES THOENER.

Witnesses:
   FRED. HAYNES,
   FERD. TUSCH.